(12) United States Patent
Miller et al.

(10) Patent No.: US 12,431,505 B2
(45) Date of Patent: Sep. 30, 2025

(54) DRY ELECTRODE FOR ENERGY STORING DEVICES

(71) Applicant: Atlas Power Technologies Inc., Abbotsford (CA)

(72) Inventors: Mitchell Miller, Mission (CA); Ali Khosrozadeh, Abbotsford (CA); Behzad Gorji Pour Shafiee, Abbotsford (CA); Omar Khaled Omar Bin Gah, Abbotsford (CA); Mohsen Sadeghi, Abbotsford (CA)

(73) Assignee: Atlas Power Technologies Inc., Abbotsford (CA)

( * ) Notice: Subject to any disclaimer, the term of this patent is extended or adjusted under 35 U.S.C. 154(b) by 163 days.

(21) Appl. No.: 18/520,178

(22) Filed: Nov. 27, 2023

(65) Prior Publication Data
US 2025/0174663 A1    May 29, 2025

(51) Int. Cl.
| | | |
|---|---|---|
| *H01M 4/62* | (2006.01) | |
| *H01M 4/04* | (2006.01) | |
| *H01M 4/36* | (2006.01) | |
| *H01M 4/587* | (2010.01) | |
| *H01M 4/66* | (2006.01) | |
| *H01M 10/04* | (2006.01) | |
| *H01M 4/02* | (2006.01) | |

(52) U.S. Cl.
CPC ......... *H01M 4/623* (2013.01); *H01M 4/0404* (2013.01); *H01M 4/0435* (2013.01); *H01M 4/0471* (2013.01); *H01M 4/364* (2013.01); *H01M 4/587* (2013.01); *H01M 4/661* (2013.01); *H01M 10/0431* (2013.01); *H01M 2004/021* (2013.01)

(58) Field of Classification Search
CPC ............. H01M 4/0404; H01M 4/0435; H01M 4/0471; H01M 4/364; H01M 4/623; H01M 4/622
See application file for complete search history.

(56) References Cited

U.S. PATENT DOCUMENTS

| | | |
|---|---|---|
| 4,354,958 A | 10/1982 | Solomon |
| 4,556,618 A | 12/1985 | Shia |
| 6,127,474 A | 10/2000 | Andelman |
| 8,540,902 B2 | 9/2013 | Xing et al. |
| 10,547,057 B2 | 1/2020 | Mitchell et al. |
| 10,741,843 B2 | 8/2020 | Duong et al. |
| 10,923,295 B2 | 2/2021 | Raman et al. |
| 11,587,741 B2 | 2/2023 | Raman et al. |
| 11,616,218 B2 | 3/2023 | Zhong et al. |
| 2005/0266298 A1* | 12/2005 | Mitchell ................ H01G 11/28 429/522 |

(Continued)

*Primary Examiner* — Yoshitoshi Takeuchi
(74) *Attorney, Agent, or Firm* — Damien G. Loveland; Valuetech Patent Agency Inc.

(57) ABSTRACT

Electrical energy storage devices made using a wet electrode application technique are associated with high energy consumption. Herein, a dry electrode or electrolyte application process involves mixing activated carbon with a binder and then fibrillating the mixture. The mixture is roll-pressed into a film, which is then actively cooled. Optionally, tension in the cooled portion of the film is increased for spooling the film. The film is adhered to a pre-treated current collector and then wound into a jelly roll for the manufacture of an electrical energy storage device.

34 Claims, 3 Drawing Sheets

(56) References Cited

U.S. PATENT DOCUMENTS

| | | | | |
|---|---|---|---|---|
| 2006/0133012 A1* | 6/2006 | Zhong | H01G 11/42 | 361/503 |
| 2006/0147712 A1* | 7/2006 | Mitchell | H01G 11/28 | 427/180 |
| 2007/0122698 A1* | 5/2007 | Mitchell | H01M 4/505 | 361/511 |
| 2008/0102371 A1* | 5/2008 | Mitchell | H01G 9/00 | 429/522 |
| 2008/0117565 A1* | 5/2008 | Zhong | H01G 11/42 | 361/502 |
| 2013/0157141 A1* | 6/2013 | Zhong | H01M 4/622 | 252/502 |
| 2015/0062779 A1 | 3/2015 | Bankaitis et al. | | |
| 2017/0098826 A1* | 4/2017 | Mitchell | H01M 4/131 | |
| 2017/0125815 A1* | 5/2017 | Amin-Sanayei | H01M 4/0416 | |
| 2017/0222213 A1* | 8/2017 | Hayashi | H01M 4/0404 | |
| 2017/0256367 A1* | 9/2017 | Raman | H01G 11/06 | |
| 2019/0229368 A1* | 7/2019 | Matsumura | H01M 10/0525 | |
| 2019/0237748 A1* | 8/2019 | Shin | H01M 4/525 | |
| 2019/0305316 A1* | 10/2019 | Wang | H01M 4/0404 | |
| 2020/0052279 A1* | 2/2020 | Chen | H01M 4/0471 | |
| 2020/0220151 A1* | 7/2020 | Reinsch | H01M 4/139 | |
| 2020/0227723 A1* | 7/2020 | Wang | H01M 4/38 | |
| 2020/0313191 A1* | 10/2020 | Wixom | H01M 4/043 | |
| 2020/0313193 A1* | 10/2020 | Shin | H01G 11/86 | |
| 2021/0098770 A1* | 4/2021 | Yudi | H01M 4/0402 | |
| 2022/0006071 A1* | 1/2022 | Petrowsky | H01M 50/414 | |
| 2022/0293952 A1 | 9/2022 | Brown | | |
| 2022/0328799 A1* | 10/2022 | Xia | H01M 4/1393 | |
| 2023/0042207 A1* | 2/2023 | Kang | H01M 4/622 | |
| 2023/0076834 A1* | 3/2023 | Li | H01M 4/624 | |
| 2023/0084563 A1* | 3/2023 | Bizet | H01M 4/0471 | 429/231.95 |
| 2023/0106377 A1* | 4/2023 | Zhong | H01M 4/048 | 429/304 |
| 2023/0108113 A1* | 4/2023 | Zhong | H01M 4/0404 | 429/304 |
| 2023/0207226 A1* | 6/2023 | Raman | H01M 10/0525 | 361/502 |
| 2023/0290999 A1 | 9/2023 | Lee et al. | | |
| 2023/0411584 A1* | 12/2023 | Yudi | H01G 11/06 | |
| 2024/0113274 A1* | 4/2024 | Xia | H01M 4/139 | |
| 2024/0154128 A1* | 5/2024 | Wang | H01M 10/0525 | |
| 2024/0194850 A1* | 6/2024 | Wang | H01M 4/139 | |
| 2024/0222594 A1* | 7/2024 | Aliahmad | H01M 4/0435 | |
| 2024/0282905 A1* | 8/2024 | Kim | H01M 4/0416 | |
| 2024/0322120 A1* | 9/2024 | Lee | H01M 10/0525 | |
| 2025/0087656 A1* | 3/2025 | Fujii | H01M 4/13 | |
| 2025/0118757 A1* | 4/2025 | Jeon | H01M 4/0435 | |

* cited by examiner

DRY ELECTRODE FOR ENERGY STORING DEVICES

TECHNICAL FIELD

This application relates to energy storage devices, particularly to compositions of and methods for manufacturing dry electrodes for electrical energy storage devices.

BACKGROUND

Energy storage devices may include batteries, capacitors, supercapacitors, and capacitor-battery hybrids, for example. Such an electrical energy storage device has a positive laminated electrode (i.e. a cathode), a negative laminated electrode (i.e. an anode), a separator and electrolyte. An electrode (i.e. anode or cathode) may have a metallic foil current collector applied with an electrode material layer on one or both sides, which is typically referred to as a laminated electrode. The laminated electrodes may be wound, stacked or otherwise assembled with intervening separators into a device, a wound device generally being referred to as a jelly roll, which is inserted into a cell container known as a can and then saturated with an electrolyte, though many other assembly configurations may be utilized.

Traditionally, the electrode layer is applied to the foil as a slurry. Typically referred to as a wet electrode application process, this process involves considerable energy consumed due to drying ovens and in some processes solvent recovery systems, and as such is associated with a relatively high carbon footprint. Additionally, the slurry process also involves the use of solvents, which tend to be toxic, costly and flammable.

More recently, electrode layers are being applied to foils as dry electrode films. However, current methods of producing dry films for electrodes are associated with problems, such as not producing films with the required mechanical strength and at the desired thickness required to complete the assembly process of both laminated electrodes and the completed energy storage devices.

U.S. Pat. No. 10,923,295 to Raman et al. discloses an energy storage device that can include a cathode, an anode, and a separator between the cathode and the anode, where the anode and/or electrode includes an electrode film having a super-fibrillated binder material and carbon. The electrode film can have a reduced quantity of the binder material while maintaining desired mechanical and/or electrical properties. A process for fabricating the electrode film may include a fibrillating process using reduced speed and/or increased process pressure such that fibrillating of the binder material can be increased. Increasing fibrillating of the binder material may facilitate formation of thinner electrode films, such as dry electrode films. This dry electrode approach requires deformable polytetrafluoroethylene (PTFE) binders with considerable plasticity, which can form fibers under shear force to connect electrode particles. The manufacturing processes include dry blending, dry fibrillating, dry feeding, dry compacting/calendaring and bonding to the collectors, which exhibit compatibility with the roll-to-roll production line.

This background is not intended, nor should be construed, to constitute prior art against the present invention.

SUMMARY OF INVENTION

The present invention is directed to a dry film, a method and apparatus for forming the dry film, and electrical energy storage devices made using the dry film. A dry film for use in an energy storage device may be prepared using a dry method which includes at least one type of active material and at least one type of binder that can be fibrillated.

In some embodiments, the powder mixture for the film may include at least one type of conductive additive. In some embodiments, the powder mixture may include at least one type of functional additive.

In the exemplary embodiments, the active materials are at least one type of activated carbon. In exemplary embodiments, the active materials are at least one type of electrode active material typically used in electrochemical energy storage devices. In additional exemplary embodiments, the active materials are at least one type of electrolyte salt. In additional exemplary embodiments, the active materials include at least one type of electrode active material and at least one type of electrolyte salt.

The powder mixture is subjected to a shear force in order to be fibrillated. The fibrillated mixture is hot roll-pressed into a free-standing film, which is then trimmed and wound. Optionally the film is cooled immediately after coming out of the hot-press rollers. The film tension is relatively low after coming out of the hot-press rollers and before trimming. At, before, or after trimming, the tension is increased in order to wind the film onto a spool without tearing. The film on the spool is then unwound and the dry film is pressed and bound to a first side of a current collector foil to form a laminated electrode. Optionally the current collector may have a second electrode film pressed and bound to the second side of the current collector foil.

In exemplary embodiments the current collector has a glue or treatment applied to it to bind it with the electrode on the first and/or second side. In additional embodiments the electrode may be laminated directly to the current collector without a glue or treatment. Treatments may include anodizing or otherwise changing the microstructure of the surface. Optionally the current collector with an attached electrode film or films may comprise two or more laminated electrode sections and require a step of slicing through to form two or more separate electrodes. The resulting laminated electrodes may then be layered and wound with another laminated electrode, with intervening ion-permeable and electrically insulating separators, to form a jelly roll, or other energy storage device assembly. The energy storage device assembly then forms the core of an energy storage device.

Disclosed is a process for manufacturing a film for an energy storage device, comprising: mixing dry, powdered active material with a binder to form a mixture; fibrillating the mixture; sieving the fibrillated mixture; heating the sieved, fibrillated mixture between rollers to form a film, the rollers being at a temperature between 50° C. and 140° C.; and actively cooling the film to below 25° C.; wherein the film is a dry electrode film or a dry electrolyte film.

Also disclosed is a dry electrode film comprising activated carbon and fibrillated binder, the fibrillated binder being present in the dry electrode film at 0.5-15% by weight.

Further disclosed is a dry electrolyte film comprising by weight: 80-98% of an active material; optionally up to 10% of a conductive material; and 0.5-20% of a fibrillated binder.

Still further disclosed is an electrical energy storage device comprising a dry electrode film, the dry electrode film comprising activated carbon and fibrillated binder, the fibrillated binder being present in the dry electrode film at 5-20% by weight.

This summary provides a simplified, non-exhaustive introduction to some aspects of the invention, without delineating the scope of the invention.

BRIEF DESCRIPTION OF DRAWINGS

The following drawings illustrate embodiments of the invention and should not be construed as restricting the scope of the invention in any way.

DESCRIPTION

A. Glossary

Figure 1:
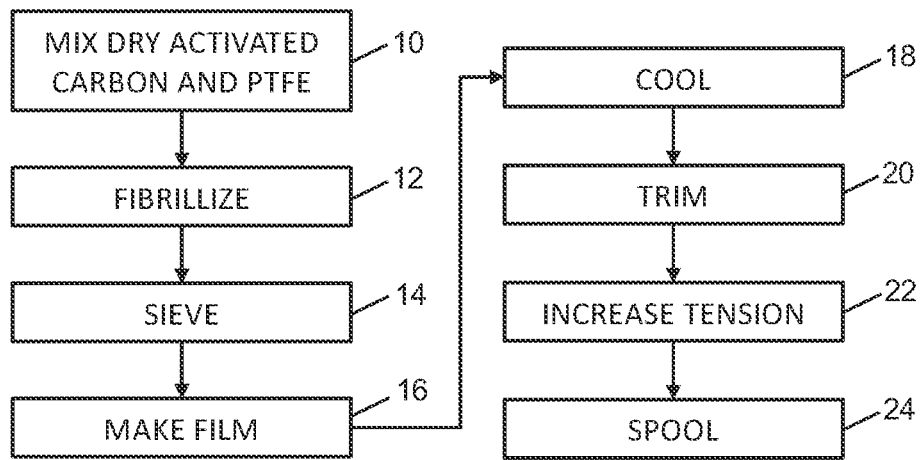
FIG. 1 is a flowchart showing some of the steps of a process for manufacturing a dry film, according to an embodiment of the present invention.

Active Material: the main active material used in making the dry film. The active material may be different depending on the type of energy storage device.

Additive: an additive used either in the production of the film or for improving the performance of the energy storage device, optional. The additive may be functional, e.g. conductive.

Compacted Mixture: fibrillated or partially fibrillated mixture obtained when the powder mixture undergoes mechanical mixing resulting in a dough-like mixture rather than fluffy mixture.

Conductive Additive: an additive used to increase the electronic conductivity of the active material and/or dry film, optional.

Dry Film, or Film—a film obtained by a dry method which can be used as an electrode of an energy storage device (dry electrode film) or as a dry electrolyte of an energy storage device depending on its material composition.

Electrolyte Salt: the main active material used in a dry electrolyte film.

ESR: electrical series resistance.

Fibrillated Mixture: the powder mixture that has undergone a fibrillating process.

Fibrillator: a machine that converts fibrillatable binder into fibers or stretched binder material forming a fibrillated material. Non-limiting examples may include crushing and shearing machines, blending machines, fibrillating machines, feeding machines, extruding machines, auger mixing machines, heat press machines, compacting/calendering machines and jet mill machines.

Foil, or current collector foil: an electrically conductive substrate or foil that facilitates the transfer of charge from/to electrodes. Electrodes are attached or bonded to the foil making a laminated electrode.

Laminated electrode: a layered structure of a current collector foil combined with a dry electrode on one or both surfaces of the current collector.

Powder Mixture: active material which may include additives (conductive additives, functional additives, etc.) and binder(s).

Separator: an ion-permeable and electrically insulating separator. It is not electrically conductive but it has pores to allow ions to pass through.

Slitting: cutting a laminated electrode to the desired width.

B. Exemplary Embodiments

In embodiments of the system and method as described the film may be prepared as part of a roll-to-roll process. As a non-limiting example, the system may include at least one roll press unit, in which the fibrillated mixture is formed into a film. The film is conveyed from the first roll press unit to a spool and spooled through one or a plurality of tensioners and one or a plurality of alignment rollers.

Exemplified embodiments of the system and method as described to prepare the electrode film may be part of a roll-to-roll process. As a non-limiting example, the system may include two or a plurality roll press units, in which the fibrillated mixture is formed into two or a plurality of electrode films. In an exemplified embodiment in which the electrode films are prepared, the electrode films are conveyed from each roll press unit to a spool or spools and spooled through a series of tensioners and alignment rollers.

Exemplified embodiments of the system and method to prepare the film may be part of a roll-to-roll process. As a non-limiting example the system may include two or a plurality roll press units, in which the fibrillated mixture is formed into a film or films. In an exemplified embodiment, in which the film is prepared, the film is conveyed from the first roll press unit to the second roll press, and may then be conveyed to a plurality of roll press units to successively reduce the thickness of the film, then conveyed to a spool or spools and spooled through one or more tensioners and/or alignment rollers.

A film for use in an energy storage device may be prepared by typical means, referred to by those skilled in the art as a dry method, which may include preparing a powder mixture and at least one type of binder able to be fibrillated. In exemplary embodiments, the powder mixture includes at least one type of activated carbon material. In exemplary embodiments the powder mixture may include at least one type of electrode active material. In additional exemplary embodiments the powder mixture may include at least one type of electrolyte material.

In an embodiment, the powder mixture is subjected to a shear force, the powder mixture then being pressed into a free-standing film which may then be laminated, onto a current collector, and which may include being laminated on one both sides of the current collector. In certain embodiments, a dry electrolyte film may be laminated onto or into a second or third film.

Method of Making an Electrolyte Film

This method may comprise preparing powder mixture including at least one type of electrolyte salt and at least one binder that can be fibrillated by undergoing a shearing process.

In exemplified embodiments of the present disclosure is a method for manufacturing an electrolyte film which may be used in one non-limiting example of a solid-state battery or semi-solid-state battery. In certain embodiments the method may include producing a solid-state dry electrolyte energy storage device. In certain embodiments the method may include a scattering technique with controlled particle size, distribution, vibration and doctor blade to deposit the dry electrolyte on a dry electrode film. In certain embodiments, most of the powder mixture may include one or a plurality of electrolyte salt(s) and may include optional additives, as measured by weight. For example, 70% of the weight of the powder mixture or more, such as 80-95% or 80-99%, or preferably 90-99% is electrolyte salt for maximum energy storage, or to achieve better electrochemical performance. The powder mixture undergoes fibrillating by being subjected to a shear force, and then additionally pressing the powder mixture into a film, wherein those skilled in the art will recognize the film as a dry or semi-dry electrolyte film.

Method of Making an Electrode Film

In embodiments of the present disclosure is a method for manufacturing an electrode film, which may be used in various applications including a few non-limiting examples such as a battery or supercapacitor. The method may comprise preparing a powder mixture including at least one type of electrode active material and at least one type of binder that can be fibrillated by undergoing a fibrillating process. In certain embodiments, the powder mixture includes at least one type of electrode active material and at least one type of electrolyte salt. The majority of the powder mixture is the electrode active material as measured by weight. For example, 70% of the weight of the powder mixture or more, such as 80-99%, or preferably 85-99% is electrode active material for lower ESR. The powder mixture undergoes fibrillating by being subjected to a shear force, and then pressing into a film, wherein those skilled in the art will recognize the film as a dry electrode film. The electrode film may be used for an anode or a cathode, which may have a thickness of 10 μm to 500 μm, preferably 50 μm to 300 μm for easier handling and improved performance of the final device. In an exemplary embodiment, current collectors formed typically of a metal with a thickness of 4 μm to 100 μm, preferably 10-45 μm are fixed with a dry film to form a laminated electrode. In an exemplary embodiment, the laminated electrode may be either an anode or a cathode.

In exemplified embodiments, to form an energy storage cell, multiple layers of cathodes and anodes may be stacked in an alternating fashion with separator(s) disposed between the anodes and cathodes. In exemplary embodiments, to form an energy storage cell, multiple layers of cathodes and anodes may typically be arranged in an alternating fashion with two or more separator(s) disposed in between the anodes and cathodes and rolled into a cylindrical cell.

Figure 2:
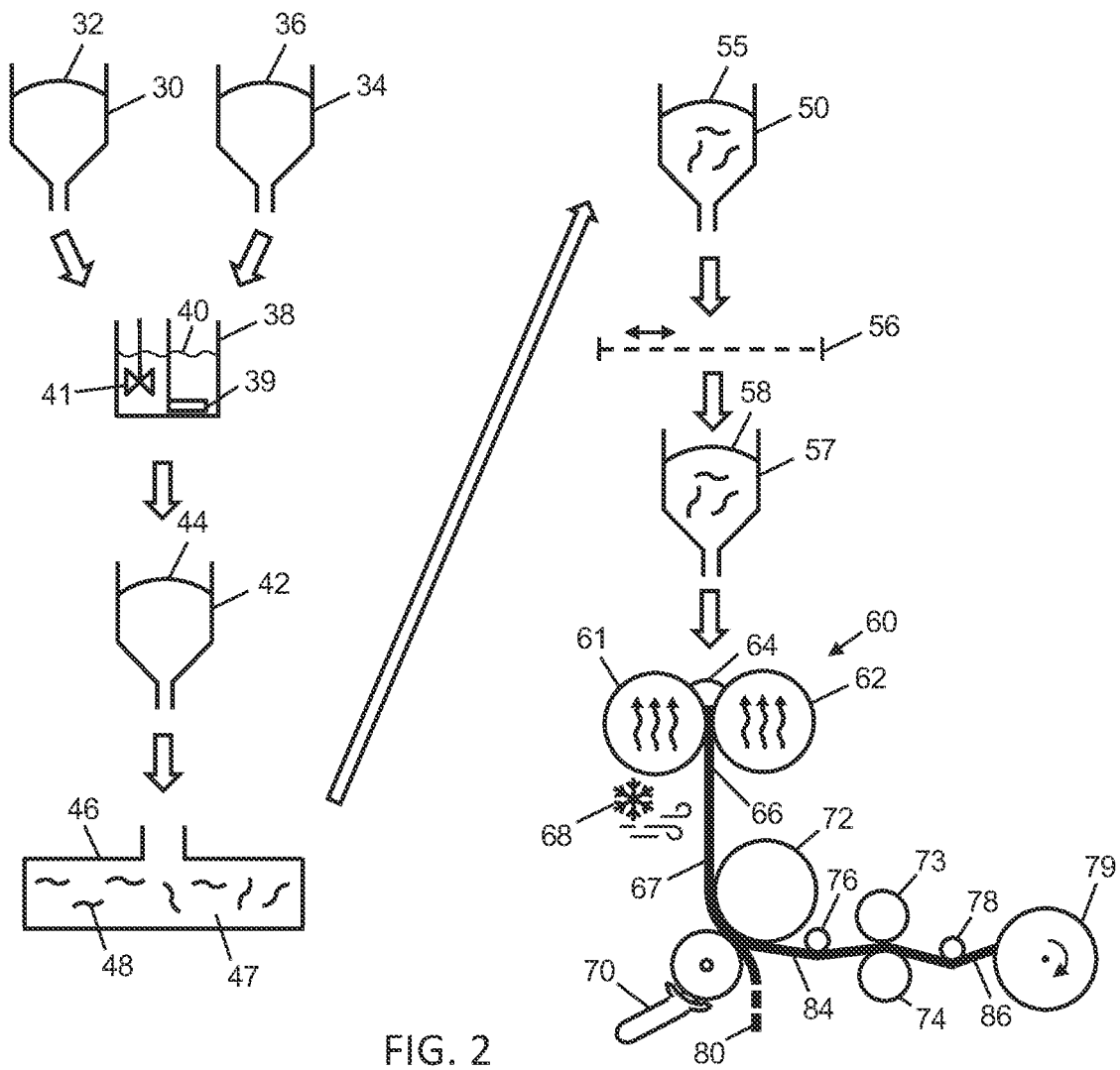
FIG. 2 is a schematic representation of apparatus for manufacturing a dry film, according to an embodiment of the present invention.

Referring to FIGS. 1 and 2, a process and apparatus for manufacturing a dry electrode material are shown. In step 10, dry, active material(s) 32 in a powder form from a hopper 30 are mixed with one or more binders such as PTFE 36 in powder form from hopper 34. The powder mixture is prepared by mechanically mixing its components, including at least one type of active material and at least one type of binder, and it optionally may include at least one type of conductive additive and at least one type of functional additive. In some embodiments a liquid such as a lubricant (e.g. a non-aqueous lubricant) may be added to the powder mixture.

The average particle size of the activated carbon is defined, for example, by: D10 1.9 (10% smaller than 1.9 μm), D50 5.6 (50% smaller than 5.6 μm), D90 9.7 (90% smaller than 9.7 μm). The average particle size of the PTFE is typically 500 μm. Other sizes and size distributions may be used in other embodiments. The amount of PTFE in the mixture is in the range of 5% to 20% by weight. Below this amount the resulting film becomes too weak to handle. Above this amount, the ESR (electrical series resistance) increases to too high a value. Also, a higher amount of PTFE increases the clumping of the mixture, making it more difficult to produce a consistent film.

The percentage amount of PTFE to use depends on what is desired in terms of film strength and thickness, and depends on the type and density of active material, etc. The aim is to use as little PTFE as possible because it replaces active materials and decreases specific capacitance. For the activated carbon specified above, about 10-15% PTFE by weight is needed to make large rolls. In some embodiments, 10-13% PTFE by weight is used. While it is possible to use less, the film will be weaker. For more dense materials, like battery active materials, less PTFE is needed. In some embodiments, the amount of PTFE in the mixture is in the range of 1% to 20% by weight. Below this amount the resulting film becomes too weak to handle. Above this amount, the ESR increases to too high a value. Also, a higher amount of PTFE increases the clumping of the mixture, making it more difficult to produce a consistent film. This wider range covers all kinds of applications: different active materials, different dry electrolyte, weaker films, thin/thick films etc.

Optionally, one or more conductive additives (such as carbon black) may be included in the mixture, up to an amount of 0-20% by weight. The inclusion of a conductive additive reduces the resistance of the film. Above this amount, the percentage of activated carbon in the film is reduced enough to have a detrimental impact on the amount of charge that can be held in the film. The average particle size of the carbon black is typically below 100 μm and down to nanometre dimensions.

The powder mixture may include, by weight 50-99% of active materials; 1-30% of binders; and 0-20% of conductive additive and/or other functional additives. In an exemplary embodiment, the powder mixture may comprise 75-98% active materials, 2-15% binders, and 0-10% additives (conductive additive and/or other functional additives).

In some embodiments the binder may comprise a fibrillatable fluoropolymer. In some embodiments the film may include between about 1% to 30% fluoropolymer particles by weight, or 5% to 20% fluoropolymer particles by weight, or 2% to 15% fluoropolymer particles by weight, or 10% to 15% fluoropolymer particles by weight, or 10% to 13% fluoropolymer particles by weight.

In certain embodiments the dry powder may comprise between about 80% to 95% of activated carbon and between about 0% to 15% of conductive additive, and the dry binder may comprise between about 1.5% to 15% fluoropolymer.

In certain embodiments the method of manufacturing a film for use in an energy storage device comprises the steps of mixing dry carbon and dry binder particles and forming a film from the dry particles.

In certain embodiments the method of manufacturing a film for use in an energy storage device comprises the steps of mixing dry carbon and dry binder particles and forming a film from the dry particles with the addition of an additive.

In certain embodiments the additives may include any one or more additive selected from: acetates, alcohols, antifoaming agents, dispersion aids, water, glycols, hydrocarbons, high boiling point solvents, Isopar™ M, ketones, mineral spirits, naphtha, pyrrolidone, surfactants, toluene and xylene.

In certain embodiments the film may have a tensile strength of 0.5 MPa or more. In certain embodiments the film may have a tensile elongation of 2% or more. In certain embodiments the film may have a porosity of 20-50 vol %. In certain embodiments the film may be used in an energy storage device and have a lithium-containing non-aqueous electrolyte. In certain embodiments the film may be used in an energy storage device and have a lithium-containing hybrid electrolyte and/or salt-in-water electrolyte. In some embodiments, the film may be used in an energy storage device having an organic electrolyte. In certain embodiments, the film may be used in an energy storage device having an aqueous electrolyte. In certain embodiments, the film may be used in an energy storage device having an ionic liquid electrolyte.

The starting materials 32, 36 may be mixed in a mixer 38, for example, in order to disperse them homogenously to make the powder mixture. The mixer may be a vacuum mixer, which serves to keep the combined starting materials 40 or mixture dry, or to remove residual moisture from the materials. There is a wide range of possible stirring speeds, depending on the amount of material and the size of the mixing chamber. For example, the materials may be mixed with a stirrer 39 operating at a speed of between 20 and 50 rpm. Different stirring speeds may be used at different times during the mixing step. There may also be one or more dispersers 41 in the mixing chamber. There is a wide range of possible dispersion speeds, depending on the amount of material and the size of the mixing chamber. For example, the materials may be dispersed with a disperser 41 operating at a speed of between 20 and 10,000 rpm. Different dispersion speeds may be used at different times during the mixing step. The running time of the mixer also has a wide range of possible durations. For example, the total running time of the mixer may be 50 minutes. This may be made up of a plurality of periods; for a non-limiting example: first, a 5-minute period during which the mixture is stirred at 20 rpm, without any dispersion; second, a 5-minute period during which the mixture is stirred at 35 rpm, without any dispersion; third, a 10-minute period at which the mixture is stirred at 50 rpm with the disperser operating at 500 rpm; fourth, a 10-minute period during which the mixture is stirred at 50 rpm with the disperser operating at 1000 rpm; fifth, a 20-minute period during which the mixture is stirred at 20 rpm with the disperser operating at 20 rpm. In practice, the mixing time could be as short as a minute and as long as several days comprised of various mixing speeds.

The starting materials, i.e. the activated carbon, the PTFE and the optional carbon black may be dried before being placed in the mixer 38, while they are in the mixer, or both. The resulting mixture may be further dried after removal from the mixer. Drying may involve vacuum drying, air drying or heating, or any combination of these. By drying the mixture, the likelihood of clumps forming is reduced, as is the likelihood of the mixture sticking in parts of the apparatus downstream of the mixer. For example, the mixture may be dried for an hour after it has been mixed.

In step 12, the powder mixture 44 of active materials and binder is fibrillated. It is sufficient to fibrillate the mixture once. Only the binder is fibrillated, not the other components in the mixture. The mixture may be transferred from the mixer or other type of mixer to a hopper 42 above the fibrillator 46 via a stream of dry air under the pull of a vacuum. The mixer 38 and the hopper 42 above the fibrillator may be connected together in a closed loop, with one or more valves to seal one from the other when necessary or to control pressure differences. The rate at which the mixture is fed into the fibrillator, or the amount that is fed into the fibrillator in a batch, may be controlled to prevent an excess of the fibrillated mixture building up and possibly clumping. The result of fibrillating is a fibrillated mixture 47 that includes fibrils 48 of the PTFE.

The step of preparing the fibrillated mixture may comprise applying a shear force, causing fibrillation. A gas system, such as one providing pressurized gas flow, may be used to subject the mixed powder to a shear force. In an exemplary embodiment, air which may be dried may be used in the gas system for material transport and feeding within the machine as well as for jet flow fibrillation. The pressure of the gas flow applied to the mixed powder may be 345-690 kPa (50-100 psi), or between 69 kPa-14 Mpa (10-2000 psi).

A mechanical system may be used to subject the mixed powder to a shear force, such as an auger or a mill, which may result in a dough-like mixture. In some embodiments, the mixture may be heated during the shearing process. In some embodiments, a liquid or an additive may be used in the mechanical approach to facilitate the process. Before mixing with the active materials, the binder(s) may be fibrillated by shear mixing in a liquid and/or with the help of a chemical system.

The structures of the powder mixing/blending unit, the shearing/fibrillating unit, roll press unit, calendering unit and additionally the lamination unit are generally known to those skilled in the art.

Figure 3:
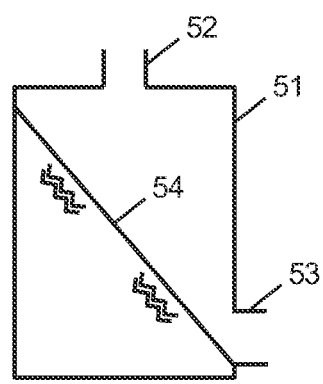
FIG. 3 is a schematic diagram of a vibratory deposit bin, according to an embodiment of the present invention.

The fibrillated mixture is then transferred to another hopper 50 for subsequent transfer of the fibrillated mixture 47 to a sieve (or screen) 56. In some embodiments, a vacuum conveyor is used to move the fibrillated mixture from the fibrillator to the sieve. In some embodiments, the transfer from the fibrillator to the sieve may be via an angled deposit bin, for example, as shown in FIG. 3. The deposit bin 51 has an inlet 52 at the top and an outlet 53 at the bottom. It has a sloping wall 54 that is vibrated, which reduces the tendency of the fibrillated mixture to clump together. The rate at which the fibrillated mixture 47 is fed into the deposit bin, or the amount that is fed into the deposit bin in a batch, may be controlled to prevent an excess of the fibrillated mixture building up and possibly clumping. Feeding of the fibrillated mixture may also be sequence-timed with a conveyor, for instance a vacuum conveyor, to ensure that the feed rate is sequenced to ensure a reduction of build-up, which may cause packing of the fibrillated material and lead to clumping.

Referring back to FIGS. 1 and 2, the fibrillated mixture 47 in hopper 50 is sieved, in step 14, in order to control the particle size of the fibrillated mixture. A sieve 56 or other particle size sorting and separating device or machine is used to prevent larger particles or clumps of particles from reaching the subsequent stage of the process. In some embodiments, the larger clumps of the fibrillated mixture are broken down into smaller clumps, which for certain embodiments may include high speed blending of the compacted mixture. For example, if a vibrating sieve is used, shown by the arrows, the larger clumps may be broken down so that they fit through the mesh of the sieve. The mixture may be released onto the sieve at a controlled rate in order to reduce clumping of the mixture. As an example, the hole size of the sieve may be 4.75 mm (US mesh #4), between 0.1 mm and 25 mm, or preferably between 1 mm and 10 mm. The sieved, fibrillated mixture is fed from the sieve to a heated hopper 57 ready for the next stage of the process.

The fluffy mixture or dough mixture may be formed into a film by means of a compacting apparatus, of which a non-limiting example may include a self-feeding dual roller and hopper assembly, the assembly operable with an inward rotation of rollers. In an exemplary embodiment the assembly includes heated rollers. In additional embodiments the assembly also includes an adjustable roller distance and pressure capability, thereby producing a film of desired thickness and density. Such a film is also called a free-standing film or self-supporting film and may be used to control the mass loading of the electrode when affixing to a foil or other substrates.

In step 16, the sieved, fibrillated mixture 58 is made into a film. This is done by feeding the sieved, fibrillated mixture from the dual roller hopper basin 57 into a heated dual roller press 60. The sieved, fibrillated mixture 58 is fed into the space between a pair of heated rollers 61, 62 positioned side by side.

The fibrillated mixture is added to the heated rollers in such a way that it does not clump and in certain embodiments does not exceed the upper circumference of the heated rollers within the hopper basin. Another vibrator may deposit the fibrillated mixture between the rollers at a steady rate that does not result in gumming up, or too much of the fibrillated material building up between or on top of the heated rollers. As the heated rollers rotate they pull the fibrillated material into and through a fine opening between the rollers to produce a film. During this process it is critical to ensure a sufficient amount of material is evenly and consistently spread across the total distance that the rollers are in closest proximity to each other, though adding too much material results in extended times of the material contacting the heated, and often high temperature rollers, which causes softening of the material and clumping of the fibrillated material. Clumping of the fibrillated material causes the material to sit in such a way on the heated rollers so as not to be drawn into the center of the heated rollers and form a film. Instead, the clumping material causes cavities below, where no material can be drawn, and results in holes or strips of missing material in the film. Another way of achieving the feeding of fibrillated and sorted material is by hand or a conveyer.

In certain embodiments the material feeding system includes a method for controlling and synchronizing the roller speed and material feed rate to produce a desired film thickness, whereby the feed material quantity remains consistent below the upper circumference of the heated rollers. In certain embodiments the roll press system includes a plurality of rollers and one or more spools, to spool the film of desired thickness.

A uniform particle size and/or consistent range of particle sizes in the mixture 64 helps to prevent gumming of the feed material in the heated roller press, and helps to prevent film gapping and inconsistencies in the film 66. Uniformly feeding the sieved, fibrillated mixture 64 onto the rollers 61, 62 is important for obtaining a consistent film. For example, the sieved, fibrillated mixture is fed onto the heated rollers so as not to rise above the uppermost point of the circumference of the rollers. Keeping the feed below the upper circumference of the rotating heated rollers ensures that the feed is directed towards the roller compression point. Continuously feeding the sieved, fibrillated mixture ensures that the first material into the roller hopper basin is the first material into the roller press and the first material formed into the film, reducing the tendency of gumming and clumping. Clumping and gumming of feed material may cause a weaker film, holes in the film, or may prevent material from being fed into the compression point of heated rollers, causing incomplete or inconsistent areas of the film.

The heated rollers have a diameter of 30 cm, for example. Other diameters are also possible, such as between 10 cm and 1 m. In the roller press, the particles 64 of the sieved, fibrillated mixture are heated and compressed into a film 66 between the two rollers. The thickness of the film 66 may be set by controlling the rotation speed of the rollers 61, 62, the temperature of the rollers, the width of the film, the material feed window, the gap between the rollers, the force by which the rollers are maintained in position and therefore pressed against the film as it is formed, the feed rate of the sieved, fibrillated mixture, and the tension by which the formed film 66 is drawn away from the heated rollers, as well as the contact distance of the heated rollers the film is pressed with to produce a film of a certain width. For example, the temperature of the heated rollers is between 50° C. and 160° C. Outside this range, the ESR and strength are less useful. Optimally, the range is 80° C. to 140° C. In other embodiments, the range is 80° C. to 130° C. Supplying the sieved, fibrillated mixture 64 more slowly to the heated rollers 61, 62 and increasing the dwell time of it between the rollers results in a thinner film, and can also result in a more consistent and stronger film compared to faster feed rates and shorter dwell times, though a dwell time too long may cause clumping. Additionally, the width of the desired film will facilitate the amount of pressure applied by the heated rollers to the film. A narrower width of film results in more pressure applied and therefore a thinner film. This may be accomplished in certain embodiments by means of controlling the basin window width, which in certain embodiments may utilize mechanical controls affixed to the basin walls to adjust its width.

In certain embodiments the method may include an adjustable electrode window to control the electrode basin window width that the fibrillated electrode material is deposited into, where it is then drawn from into the heated rollers of the film press machine. Certain embodiments may include controlling the electrode basin window width. In certain embodiments the window width may be increased to 10 cm or greater than 10 cm such as 20 cm, or in certain embodiments 30 cm, or in additional embodiments greater than 30 cm, to allow an increased tension to be applied to the film as it is spooled after being pressed by the film press machine. In certain embodiments the method includes controlling the basin window width, wherein increasing the window width allows increased tension on the electrode film spool by means of distributing the tension across a wider area of the film. In certain embodiments the method includes controlling the basin window width, wherein decreasing the window width allows increased pressure by means of the heated film press rollers on the electrode film, by means of concentrating the pressure across a shorter area of the film.

Depending on the embodiment and the parameter settings of the heated rollers, the feed rate of the sieved, fibrillated mixture is such that the dwell time of the sieved, fibrillated mixture on the heated rollers is limited to a maximum of 30 seconds, a maximum of 60 seconds or a maximum of 15 minutes, for example. Beyond these times, the material risks having its quality reduced. By controlling the feed rate and the time for which the sieved, fibrillated mixture is exposed to the heated rollers. This helps to prevent clumping and gumming of the sieved, fibrillated mixture. In some embodiments, the mixture (matrix) may be heated and fed onto cold or unheated rollers. In this case the temperature range of the rollers is extended to include the range 10° C. to 50° C., although a more suitable overall range is 60° C. to 150° C.

Controlling the material feed rate and time exposed to heated rollers prevents clumping and gumming of the fibrillated material. Keeping the material below the upper circumference of the rotating heated rollers ensures material is directed toward the rollers' compression point. Continuously conveying the material ensures the first material into the hopper is the first material formed into a film, reducing gumming and clumping. Clumping and gumming of feed material may cause weaker material, holes, or prevent material to feed into the compression point of the heated rollers, causing incomplete or inconsistent areas of the film.

For example, the dual roller compression step may be a step of pressing the powder for a film into a film having an average thickness of 10-1,000 µm, or 20-500 µm, or 30-170 µm in exemplary embodiments.

In certain embodiments the roll press unit may have a controllable roller temperature, and in these embodiments the roller temperature may be set to a temperature of 5-200° C. In additional embodiments, the at least one of the roller(s), each independently, in the roller press unit, may have a temperature of 5-200° C. Additionally, the film thickness and density (resulting in energy storage device mass loading) may be controlled by reducing the gap between the rollers in the roll press unit, or by increasing or decreasing the speed ratio of the rollers, or any additional referenced parameters.

After the film has been formed by the roller press, the film is cooled as soon as practical, in step 18, to decrease softness and pliability. For example, it is cooled by passing it over and in contact with a chilled roller, through a region of cooled air 68, or through a spray of compressed, liquified gas which evaporates on or in the proximity of the film. The cooled air may be directed onto the film, or other cooled gas may be directed onto the film. The zone in which the film is cooled is arranged close to and downstream of the heated roller press (e.g. within 30 cm), in order to reduce the opportunity for the film to break or tear. The temperature to which the film is cooled is ambient temperature, for example 25° C., or 10-70° C., or below. Actively cooling the film provides a stronger and less gummy film compared to not cooling the film, or allowing the film to passively cool to ambient temperature. Furthermore, by actively cooling the film, a higher temperature of the heated rollers is possible than without the active cooling. This is because the increased weakness of the film due to the higher temperature is promptly mitigated by the active cooling. By strengthening the film, increased tension may be applied to it for spooling.

Figure 4:
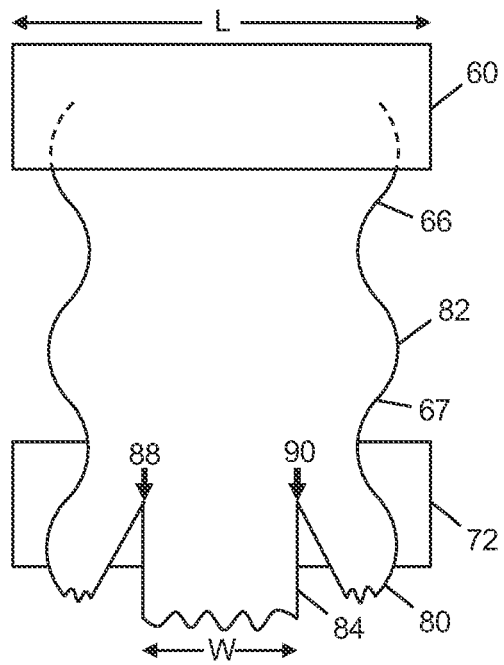
FIG. 4 is a schematic diagram of the trimming of a dry film, according to an embodiment of the present invention.

In step 20, the cooled film 67 is trimmed, for example by cutters 70 acting on the cooled film against a support roller 72, resulting in trimmings 80. During formation of the film 66, its edges may be uneven or jagged and so the film must be trimmed to a constant width for spooling and later use in energy storage devices. Generally the wider the film, the sturdier it is as the tension during the spooling of the film is distributed across a greater distance at the weakest point while exiting the heated rollers and still being soft and pliable. Trimming the film as soon as practical after its formation helps to eliminate the weaknesses and weak points caused by the ragged edges. Depending on the embodiment, the width of the film may be selectable by trimming at different, adjustable points. Referring briefly to FIG. 4, the film 66 is formed by the heated roller press 60, and has uneven edges 82. The film is a cooled film 67 by the time it reaches the support roller 72 for the cutter. The heated rollers of the heated roller press 60 have a length L which is greater than the final, trimmed width W of the film 84 as defined by the spacing between the points 88, 90 at which the cutters cut away the uneven edges 80. For example, L is 24-34 cm and W is 23-33 cm.

The portion 80 of the film that is removed during the trimming step may be collected and recycled. In one embodiment, this unwanted material may be put back into the process, for example by shredding it, pulverizing it, optionally mixing it with a desired percentage of the mixed material and/or fibrillated material, and placing it into the hopper 42 above the fibrillator, optionally with additional, fresh binder material, mixed electrode material, and/or binder agents, which may then be fibrillated. In another embodiment, the unwanted trimmings may be put back into the process, for example by shredding them, pulverizing them, optionally mixed with a desired percentage of the mixed material and/or fibrillated material, and placing them into the hopper 50 above the sieve. In other embodiments, the trimmings may be re-carbonized, optionally activated or reactivated (carbonization or recarbonization), and then used as starting material 32 for the mixing step. Recycling provides for lower waste, higher utilization and reduced waste disposal costs.

In certain embodiments the method includes the process to recycle material that was in excess during the production of the film. An exemplary process of carbonizing the waste material involves: optionally shredding the waste, placing the material without adding any additives inside a high-temperature vacuum oven, creating an inert environment inside the oven by repeatedly injecting and purging with high purity nitrogen gas (purity 99-99.99999%). The temperature for the carbonization process may be from 500° C. to 900° C. The duration may be from 10 min to 10 h, for example 2 h.

After the cooling the film, the tension in the film is increased and/or a tension is applied to the film in step 22, which is an optional step. In order to increase the tension, the film is pinched between a pair of pinching or compressing roller or rollers 73, 74 or alternative pressing device. In certain embodiments the pinching roller or rollers may have a rubber, foam, or other soft surface for gripping or pressing onto the film though not limited thereto. An automatically adjustable tensioner, e.g. a rotating tensioning roller 76, controlled by a tensioning sensor(s) individually or in conjunction with a pivoting or swinging tension roller sets a steady tension for a first portion 84 of the film, i.e. the portion of the film between when it is first formed by the heated rollers and the pinching or pressing rollers or surface. Another automatically adjustable rotating tensioning roller 78 controlled by a tensioning sensor individually or in conjunction with a pivoting or swinging tension roller, downstream of the pinching or pressing rollers or surface, sets a steady, increased tension in the second portion 86 of the film downstream of the pinching or pressing rollers or surface, between the pinching or pressing rollers or surface and a spool 79 onto which the more highly tensioned film is wound. The tensions in the two portions of the film are independently controllable.

For a 10-25 cm wide film of 50-600 µm thickness, the tension in the first portion is in the range 0.001-20 N and the tension in the second portion is 5-60 N. Ideally the tensions in the two portions of the film are independently controllable. For example, the first tension is between 6.7 µN-0.13 N per mm$^2$ and the second tension is between 0.033N-0.4N per mm$^2$, both in terms of the cross-section of the second portion of the trimmed, cooled film. The dry electrode film may therefore be wound onto a spool under a tension of 0.033-0.4 N per mm$^2$ cross-section of the dry electrode film.

In some cases the tension in the first portion is 0.001-50 N. For a 30 cm wide film of 110 μm thickness, the tension in the first portion is in the range 5-20 N and the tension in the second portion is 25-40 N. In some cases the tension in the first portion is 0.001-50 N. In some cases the tension in the second portion is 20-60 N. For wider or thicker films the tension range is proportionately higher, and for narrower or thinner films the tension is proportionately lower. If the tension is above these limits, then the film is at increased risk of tearing or breaking, or the film may be loose or misaligned so that it cannot be fed into or onto the subsequent component of the system. Also, if the tension is too high, additional stress is placed on the spooled film, which may crack or break down faster than desired. Considering the examples above, the dry electrode film is able to withstand a tension of 0.033-2.2 N per $mm^2$ cross-section of the dry electrode film.

In step 24, the more highly tensioned film 86 is spooled, resulting in a spool of dry electrode film that is ready for adhesion to a current collector. For the most part, the tension of the film on the spool is between 20 N and 40 N for a film of width 30 cm. For wider films the tension range is proportionately higher, and for narrower films the tension is proportionately lower. Higher tensions during spooling allow for the films to be more tightly wound than for lower tensions. More tightly wound spools allow for more accurate control of the subsequent laminated electrode and/or electrode forming process, in which the film is adhered as a dry film electrode to a metallic foil current collector. As an example, a spool may be wound with a dry electrode film with a thickness of 70-200 μm or less, width of 30 cm or less and a length of 100 m-250 m.

The film 66, 67, 84 at lower tension, and the more highly tensioned film 86 do not need to go through a calendering process, though in certain embodiments the immediate compression and calendering of the film may increase the film's mechanical strength and decrease its thickness. In a preferred embodiment the tensioned film is spooled without prior calendering, i.e. the film is uncalendered. However, in some embodiments, a calendering step may be included to make the film thinner, and potentially more useful.

In certain embodiments the method may include producing a film by means of multi-point tensioning. Current methods of producing a film, such as an electrode for use in an energy storage device, utilize a consistent tension between beginning stage and/or formation of the film and spool where the film is being spooled. This results in limited ability to spool film with acceptable or high tension, as during the film pressing stage the film is subjected to heat causing the binding material and electrode material to fuse together and results in a softer, weaker and more pliable film. Multi-point tensioning is accomplished by utilizing compressing or pressing points (pinching points) to allow two or more (plurality of) sections of the film, such as the initial pressing stage and then the spooling stage, to be subjected to different tensions and strengths of mechanical pull on the film.

This results, in certain embodiments, that the first section of film, which is extruded from the heated rollers during the first step of forming the electrode material into a film as it is exiting the heated rollers, and which is weak, may be designed to allow the movements of the film with a very low tension. This low tension is an improvement as it allows time for the material to cool and strengthen prior to being subjected to a higher tension that may otherwise cause ripping of the film. This also results, in certain embodiments, that a compression or pressing point may be situated at the point in the process where the mechanical strength of the film has increased to allow a second tension, which typically would be a higher tension, to be subjected to the film material in order to allow the film to be spooled at a higher tension, to allow easier handling and affixing of the film to the current collector at a later stage of the energy storage device assembly.

It should be noted that multi-point tensioning may also be accomplished by utilizing two separate devices wherein when the film is first being formed and spooled the film is spooled under low tension on the first device, then the low tension spool is moved to a second device, unrolled and respooled at a higher tension after the film has had time to mechanically strengthen. However, a single device with multiple stages of different tension is preferred due to the simplified processes and fewer stages for the initial film production. In certain embodiments multiple compression points may be implemented and may result in multiple sections with controllable and independent tensions.

The benefits of multiple different sections with different tensions may allow weak, recently formed film to remain under low tension resulting in less tearing. Additionally, multiple different tension sections may allow cooled and set films to be subjected to a higher tension than weaker films that have not had time to increase in mechanical strength. Additionally, higher tension sections may allow spools of film to be spooled tightly and accurately, wherein tightly wound spools allow accurate control to produce electrodes.

An improved distribution of tension may improve the spool tension as a result of a wider electrode. An increased pressure of the heated rollers may result in a thinner electrode. A balance between the width of the window to improve spool tension and the width of the window to ensure a film with the desired thinness is important to ensure a film with the desired thickness and a desired tension.

In certain embodiments the method may include facilitating controlling of the temperature of the heated rollers, the rotational speed of the heated rollers, the tension the film is subjected to by means of the spooling and the spooling speed, to control the thickness of the film, the tension of the spooled film, and the consistently maintained quality of the film. In certain embodiments the method facilitates the control of the following: roller heat, rotational speed of heated rollers, feed material feeding speed, roller width, roller compression point distance, roller compression pressure, spool spooling speed, tensioner(s) to adjust tension of the film and the tensioner(s) to adjust spool spooling speed, to produce a film of desired thickness, strength, width, length spooling tension, and spooled tension.

As the width of the trimmed film is smaller than the width of the window above the heated rollers where the film is originally made, in some embodiments the location of the cutters is important to obtain consistent thickness across the film while ensuring the weak points are removed. Moreover, by having adjustable rollers, the tensions applied to different sections of the film can be adjusted to ensure a uniform tension applied horizontally and prevent the tearing of the film and elongation and waviness across the film.

Figure 5:
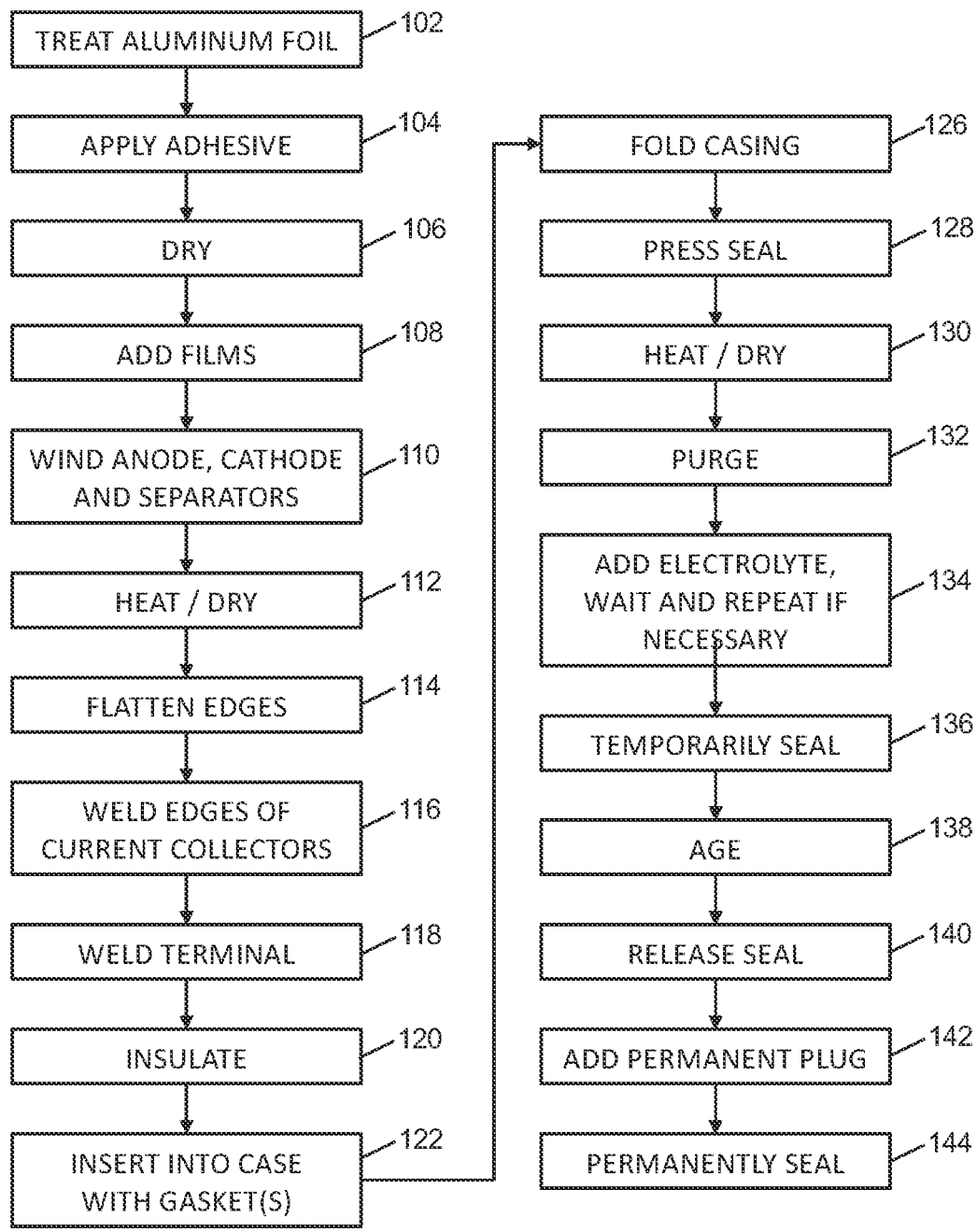
FIG. 5 is a flowchart showing steps of a process for manufacturing an energy storage device with the dry film, according to an embodiment of the present invention.

Referring to FIG. 5, a flowchart shows steps of a process for manufacturing an electrical energy storage device with the dry electrode material.

Typical Manufacturing Process

A typical manufacturing process for primary cells, secondary cells and supercapacitors can be broadly divided into an electrode fabrication step, an electrode layering or winding step, a cell assembly step, and a cell testing or aging step. The electrode fabrication step is further divided into a powder combining and mixing step, mixed powder fibrilization step to form a fibrillated mixture, a film pressing and forming step, a film lamination to a current collector step, in certain embodiments a slitting step, a second film lamination step to the current collector on its opposing side, in certain embodiments an electrode slitting step, and a layering or winding step to form the interior cell contents, or the like.

In optional step 102, the aluminum or other suitable foil for the current collector is treated to remove potential contaminations or residual oils that may be present on its surface as a result of its manufacturing process. Such residual oil may be removed by heating the foil to 50° C.-200° C. until the oil has substantially evaporated or been displaced. In other cases, the residual oil may be removed by chemical treatment of the foil. In other cases, the residual oil may be removed by air or atmospheric plasma treatment of the foil. The foil may be heated by one or more hot rollers, for example, or by a radiant or convection heater. By removing the residual oil, the adhesive that is to be applied to the foil binds more consistently and reliably to it. In turn, this allows the dry electrode film to adhere more consistently and reliably to the foil. In certain embodiments the treatment may not be necessary as the current collector may be provided without residues or oils on its surface. However, in some case where there is no oil present, treatment may still be beneficial to improve surface adhesion by altering the microstructure of the surface.

In step 104, in certain embodiments, one or a plurality of electrically conductive adhesive materials is applied to one or both sides of the foil, to a width that corresponds to within 0.1 mm, for example, of the desired width of the electrode. The application of one or more adhesive materials may be referred to as priming the foil. The conductive adhesive may comprise one or more types of adhesive polymers (5-45 wt. %). In some embodiments the adhesive polymer binder is selected from the group consisting of polyvinylidene fluoride (PVDF), polytetrafluoroethylene (PTFE), SBR (styrene butadiene rubber), PVA (polyvinyl alcohol), polyethylene oxide (PEO), polyacrylic acid (PAA), polyvinylpyrrolidone (PVP) casein, sodium alginate, guar gum, xanthan gum, polyethylene glycol (PEG), gelatin, gum arabic, gellan gum and admixtures thereof. The adhesive may also include one or more forms of the conductive carbon materials (55-90 wt. %). Non-limiting examples of conductive carbon includes activated carbon, carbon black, graphene, carbon nanotubes, biomass-based porous carbon, starch or their combinations. The adhesive may also include a solvent, which may be diluted in an aqueous solution. The solvent may comprise one or a combination of non-limiting examples such as ethanol, methanol, isopropyl alcohol, propanol and n-butanol. The adhesive may also include one or more additives, such as a stabilizer, thickening or emulsifying agent with a weight percent of about 0.001-10 wt. %. The thickening agent may comprise any one or a mixture of cellulose-based water-soluble polymers. Non-limiting examples include carboxymethyl cellulose (CMC), methyl cellulose (MC), hydroxypropyl methyl cellulose (HPMC), ethyl cellulose (EC), hydroxyethyl cellulose (HEC), and sodium carboxymethyl cellulose (Na-CMC) The adhesive may be applied by a brush, an ultrasonic spray, a splatter, roller, or by a micro gravure, or by any other suitable technique. A doctor blade may be used to help spread the adhesive evenly on the foil or control the amount of the adhesive on the roller. The adhesive is spread to a thickness of 0.1-30 µm, for example.

In certain embodiments, priming or thin-coating provides a better adhesion of electrode material and increases the foil's roughness.

In certain embodiments the method includes applying a glue, wherein the glue composition is also prepared by a process of continuous stirring/blending which may or may not include the sonication of the conductive carbon materials in order to obtain a uniform suspension.

In certain embodiments the glue composition is made with the addition of a stabilizer, wherein the stabilizer is used to reduce or prevent phase separation of the glue in order to provide a homogenous material with consistent properties for adhesion and conductivity. A water-based glue may be used in some embodiments. In certain non-limiting examples to make the glue, a first binder may be dissolved in an excess amount of water. In additional embodiments conductive carbon materials are then added, followed optionally by a second binder after which the combined mixture is stirred. In another embodiment, a glue with a stabilizer may be used. To make this glue, a first binder may be dissolved in an excess amount of water. The thickening or stabilizer, in a water/alcohol solvent, is then mixed with the first binder solution. Next, conductive carbon materials are added, followed by the second binder. The combined mixture is then stirred.

In step 106, the foil with the applied adhesive is then optionally dried. This may be achieved, for example, by curing the foil with adhesive in an oven. The foil may then be considered to be a primed foil. Drying may not be necessary depending on the preceding steps.

In some embodiments, the foil may be coated on one side with the adhesive, dried, and then coated on the other side with further adhesive, and then dried again.

In step 108, after the adhesive has been dried, a dry film is then applied to one or both sides of the primed foil. In certain embodiments the foil may be coated on one side with adhesive then placed contacting a film prior to being dried, then pressed to the film and dried, followed by, in certain embodiments, a repeat of these steps for the second side of the foil. It is not necessary to calender the film after it is removed from the spool and before it is applied to the foil, however, calendering is an option that may be included. The resulting foil with one or more adhered electrodes is referred to as a laminated electrode.

In certain embodiments a lamination step of forming the film on at least one surface of a current collector may be carried out. The lamination step may comprise a step of pressing and attaching the film onto a current collector. The lamination may also be carried out by the use of a lamination roller or rollers, wherein the lamination roller or rollers may be maintained at a temperature of 5-200° C.

In some embodiments, the foil may first be coated on one side with the adhesive, dried, glued with the dry electrode, and then coated on the other side with further adhesive, dried again and then glued with a second dry electrode. In certain embodiments, the composition of the glue may vary for the anode and cathode.

In some embodiments, the foil may first be coated on one side with the adhesive, glued with the dry electrode, dried, and then coated on the other side with further adhesive, glued with a second dry electrode and then dried again.

In optional step 109, this involves slitting or trimming the laminated electrode roll into two or more rolls using the slitting machine. If the laminated film has two or more sections, it must be split into two or more. For a supercapacitor with symmetric electrodes, for example, one section is used as an anode and one section as a cathode. For an asymmetric device (such as a battery or hybrid supercapacitor/battery), two rolls of one type (such as anode or cathode) may be produced from slitting.

In step 110, two laminated electrodes, one to become positive and the other negative, are wound with intervening separator layers into a roll, which is referred to as a jelly roll. The positive and negative electrodes are aligned with each other as they are wound. In certain embodiments two laminated electrodes, one to become positive and the other negative, are aligned with each other and layered with intervening separator layers into a multilayer assembly, which is referred to as a pouch cell or prismatic cell. The separator layers may be, for example, 10-50 µm cellulose layers as one non-limiting example, though those skilled in the art will appreciate any number of materials may be used as a separator.

In step 112, the jelly roll or multilayer assembly is heated in a vacuum oven to ensure that it is dried. The temperature may be 50-150° C., for example, and the duration of heating from 12 hours to a week or a few weeks, for example. Other drying techniques may be used to remove the residual moisture in the jelly rolls.

In step 114, the edges of the foil in the jelly roll are bent over so that they are flat, i.e. perpendicular to the axis of the jelly roll. The separator material prevents shorting between the electrodes.

In step 116, the bent over edges of each end of the foil in the jelly roll are welded together. The bent over edges are welded to additional upper and lower current collectors. This step is optional as it is also possible to design the can without additional collectors.

In step 118, a terminal is welded or otherwise connected to one of the flattened ends of the jelly roll. This terminal is to become the upper terminal of the electrical energy storage device.

In step 120, an insulator is applied to the jelly roll, around the upper terminal and the exposed edges (negative) of the jelly roll, to prevent short circuiting. The upper terminal is left exposed for eventual electrical connection.

In step 122, the jelly roll is inserted into a cell casing or can, with one or more gaskets around the negative cap on the upper terminal. The cell casing or can has a closed bottom and becomes one of the terminals of the cell. The lower current collector sits on the bottom of the can and is welded to it in some applications.

In step 126, the cell casing or can is folded over the upper gasket and the insulation around the upper terminal. The cell casing or can is electrically insulated from the upper terminal.

In step 128, the folded upper part of the cell casing or can is sealed onto the upper gasket. This may be done, for example, by press sealing.

In step 130, the resulting cell is heated in a vacuum oven to ensure that it is dry. Moisture and residual solvents may escape from inside the cell through an injection port in the cell casing or can. The temperature may be 20-150° C., for example, and the duration of heating from 12 hours to a week or a few weeks, for example. Other drying techniques may be used.

In step 132, the inside of the dried cell is purged via the injection port with nitrogen or other inert gas.

In step 134, the purged can is injected with electrolyte via the injection port. The electrolyte is allowed to saturate the jelly roll over a period of time. Further electrolyte is added if required and allowed to soak into the jelly roll.

In step 136, the cell casing or can is temporarily sealed with a rubber port cover.

In step 138, the cell is aged, by repeatedly charging and discharging the cell, which may include one or more charging and discharging current rates. Aging may be repeated for 1 day to up to a few weeks until the difference in state of charge between two consecutive charge-discharge cycles is less than 0.1%. The aging or warming-up process might be performed by other methods, e.g., by holding the voltage for a certain time or repeatedly charging and discharging the cell.

In step 140, the temporary seal is opened to allow any built-up gas inside the cell to escape.

In step 142, a plug gasket is permanently inserted in the cell's injection port for the electrolyte in order to seal it. The cell's injection port for the electrolyte is welded over to hermetically seal the cell. The resulting cell is an electrical energy storage device, such as a supercapacitor, for a non-limiting example.

Steps 114-142 may be replaced by other steps that are for manufacturing other shapes of energy storage device, and could be replaced, for example, by a single generic assembly step.

Figure 6:
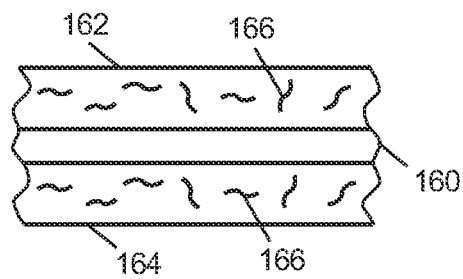
FIG. 6 is an enlarged schematic cross-section of laminated electrode with the dry electrode material, according to an embodiment of the present invention.

FIG. 6 is a schematic cross-section of a portion of a laminated electrode with the dry electrode material. The current collector 160 is an aluminum foil coated on both sides with a dry electrode 162, 164. The fibrillated binder material is shown schematically in both electrode layers. The fibrils 166 are generally distributed homogenously throughout the electrode layers.

C. Variations

The form of the cell may be different, e.g. it may be a pouch cell, a prismatic cell, a multilayer assembly, etc.

Plastic binders other than PTFE may be used instead of the PTFE. For example, PVDF (polyvinylidene fluoride) or ultra-high molecular weight polyethylene may be used. The described system and method include an electrode film prepared by a dry method, wherein the electrode powder mixture may include at least one type of binder such as polytetrafluoroethylene (PTFE), polyvinylpyrrolidone (PVP), polyvinylidene fluoride (PVDF), polyethylene oxide (PEO), or carboxymethylcellulose (CMC) or polyvinylidene fluoride-co-hexafluoropropylene (PVDF-HFP)

Mixers other than a vacuum mixer may be used, provided that the activated carbon and PTFE being mixed are kept dry.

Increasing the tension is part of the way the film is wound. After starting to make the film, the first end of the film is wrapped around the core of the spool, then the tension is increased to allow for accurate and tight winding. Multi-point tensioning may allow for lower tension immediately after coming out of roll press compared to the remainder of the line, or it may refer to increasing the tension for spooling, or it may mean both.

The current collector foil may be a metal other than aluminum, such as copper. Non-limiting examples of the current collector material include aluminum, baked carbon, copper, nickel, stainless steel surface-treated with carbon, steel or iron with surface-treated, silver, stainless steel, titanium or the like. The current collector material and/or composition is not particularly limited, though it is preferred to have a high conductivity, and whereby it does not cause any chemical change or side reactions in the energy storage device.

The current collector may additionally be processed to have fine surface irregularities on the surface of the current collector which may enhance the binding force with the film, and may additionally reduce the surface tension between the current collector and electrode film. The current collector may be in various shapes, including a foil, a film, a sheet, a net, a weave, a mesh, a porous body, a foamed body, a non-woven web, or the like.

In certain embodiments a conductive material may be used to increase conductivity which is not limited to any particular material as long as it has conductivity while not causing any chemical change in the corresponding energy storage device. Non-limiting examples of the conductive material may include: acetylene black, carbon black, channel black, furnace black, lamp black or ketjen black, thermal black; graphene; conductive fibers, examples of which include carbon fibers and metal fibers; metal powder, such as aluminum and nickel; fluorocarbon; a conductive whisker, examples of which include zinc oxide and potassium titanate; one or more conductive metal oxides, an example of which includes titanium dioxide; one or more conductive polymers, examples of which include polyphenylene derivatives. In exemplified embodiments, the conductive material may include one or more of the following: activated carbon, carbon black, carbon nanotubes, graphite.

Depending on the conductivity of the electrode active material, a conductive material may be required and/or beneficial to be added to the powder mixture, the conductive material may make up a minority of the powder mixture in an amount 0-20% (e.g., 5%) by weight, as one non-limiting example. Some non-limiting examples of conductive materials may include one or more, for a non-limiting example a combination of two, of: a conductive carbon such as carbon black and/or acetylene black, graphene and/or Curved Graphene™ as described by Skeleton Technologies of Estonia, ketjen black, or Super P® (e.g. carbon black sold by Imerys Graphite & Carbon of Switzerland), activated carbon, carbon nano-tubes (CNT), graphite particles, or partially graphitic carbons such as a partially graphitic active carbon composition, a conducting polymer, or combinations thereof.

In an exemplary method of producing an energy storage device and the described film by means of a dry film production method also referred to as a dry electrode production method, the method includes the following steps: a step of mixing electrode material; a step of drying mixed electrode material; a step of conveying dry mixed electrode material to a fibrillating machine; a step of fibrillating electrode material; a step of conveying fibrillated material to a particle size sorting machine; a step of sorting fibrillated material to a desired particle size; a step of feeding sorted fibrillated particles into a heated roller press to form a film; a step of heating the fibrillated particles; a step of compressing heated fibrillated particles; a step of forming a film; a step of controlling heated roller rotation speed; a step of controlling film production speed; a step of controlling the roller gap distance; a step of controlling said rollers' pressure directed at a fibrillated material to form a film; a step of controlling desired film thickness; a step of feeding a film to a spool and spooling film; a step of controlling tension of a first part of a film; a step of controlling tension of a second part and/or spool of film; a step of controlling film width by means of controlling the heated roller basin width; a step of controlling tension distribution across the film width by means of controlling the heated roller basin width; a step of controlling tension across film with multiple tension regions and compression or pressing points; a step of pre-treating a current collector foil with heat and/or chemical(s); a step of priming pretreated current collector foil with an adhesive such as a conductive glue or conductive binder; a step of adhering an electrode film to the first side of a primed current collector; a step of priming a second side of a pre-treated current collector; a step of adhering a second electrode film to a second side of a primed current collector; a step of slitting an electrode; a step of vacuum heating and drying the laminated electrodes; a step of winding anode, cathode, and separators to form an energy storage device jelly roll; a step of heating and drying jelly rolls in a vacuum oven; a step of bending jelly roll foil edges flat; a step of welding an upper current collector on the jellyroll; a step of welding a lower current collector on the jellyroll; a step of welding an upper terminal on the upper current collector of jellyroll; a step of providing an insulator around exposed edges of the jellyroll and upper terminal to prevent short circuiting; a step of inserting the jellyroll in a cell case or can with one or more gaskets; a step of folding the cell casing over the gasket and upper terminal; a step of press sealing the folded upper casing into the gasket; a step of heating and drying the jelly roll cells in a vacuum oven and purging with nitrogen or inert gas; a step of injecting electrolyte; a step of letting electrolyte saturate the jellyroll electrodes; a step of injecting electrolyte a second or plurality of times; a step of temporarily sealing cell case; a step of charging and discharging the cell, generally called cell aging; a step of removing the temporary cell seal to allow excess gas to escape cell; a step of inserting a permanent plug in the cell to seal the cell; a step of welding the injection port to hermetically seal the cell.

Devices and electrode types: In an exemplary embodiment, the electrochemical energy storage device is a supercapacitor. In certain embodiments, the energy storage device is a symmetric supercapacitor in which both electrodes are the same. In some embodiments, the energy storage device is a hybrid or asymmetric supercapacitor where both electrodes and/or electrode substrates are different. In some embodiments, the active material of an electrode stores electrical energy mainly using the electrical double-layer (EDL) mechanism (a so-called EDL-type electrode). In some embodiments, the EDL-type electrode material is electrically conductive and porous with micropores, mesopores and macropores. In the preferred embodiment, the active material of an electrode includes an activated carbon. In some embodiments, the EDL-type electrode material is selected from conductive porous carbons such as activated carbons, mesoporous carbons, hierarchical porous carbons, graphene-based materials, activated graphene, exfoliated graphite, activated exfoliated graphite, carbon nanotube-based materials, carbide-derived carbons, and/or combinations thereof. In some embodiments, the active materials of electrodes include conductive porous materials with functional groups such as oxygen-containing and nitrogen-containing groups. In some embodiments, the active materials of electrodes include conductive porous materials which are doped with heteroatoms such as nitrogen, oxygen, sulfur, phosphorus, chlorine, bromine, and iodine. In some embodiments, the active material of electrodes is a nanostructure with a certain shape, size, and porosity.

In some embodiments, the active material of the energy storage device electrode may be a pseudocapacitive material which takes advantage of reversible surface or near-surface Faradaic reactions to store charge. In some embodiments, the pseudocapacitive materials are selected from conducting polymers (such as polyaniline, polypyrrole, and poly (3,4-ethylenedioxythiophene (PEDOT)-based polymers), transition metal oxides and hydroxides (such as $RuO_2$, $V_2O_5$, $NiO_x$, $CoO_x$, $FeO_x$, $MnO_2$, $Ni(OH)_2$, $Co(OH)_2$), and nitrides (such as vanadium nitride), sulfides (such as vanadium disulfide) and/or combinations thereof. In some embodiments, the active material is a so-called Mxene, a class of two-dimensional inorganic compounds that have atomically thin layers of transition metal carbides, nitrides or carbonitrides.

In some embodiments, the electrode materials of an asymmetric supercapacitor are selected from EDL-type materials, pseudocapacitive material, or their composites. In some embodiments of the energy storage device, one electrode is EDL-type and the other one is pseudocapacitive.

In some embodiments, the energy storage device is a hybrid supercapacitor wherein one electrode is capacitor type and the other one is a battery type. In some embodiments, the cathode material in the hybrid supercapacitor is EDL-type, pseudocapacitive, or their composite. In some embodiments, the battery-type anode is selected from an insertion type (such as lithium titanate (LTO), $V_2O_5$, $Nb_2O_5$), a conversion type (such as $Fe_3O_4$), alloy type (such as silicon, tin), metallic (zinc), a carbonous material, and the like. In some embodiments, the battery-type anode is a composite of two or more materials. In some embodiments, the energy storage device is lithium-ion capacitor, wherein the anode active material allows for reversible intercalation of lithium ions such as lithium titanate (LTO, $Li_4Ti_5O_{12}$). In some embodiments, the energy storage device is a zinc-ion capacitor, wherein the anode active material allows for reversible plating and stripping of zinc ions such as metallic zinc or a zinc-based composite. In some embodiments, the energy storage device is sodium-ion capacitor.

In some embodiments, the energy storage device is a rechargeable (or secondary) battery. In some embodiments, the energy storage device is lithium-ion battery. In some embodiments, the anode active material in the energy storage device is selected from a carbonaceous material (e.g. graphitic carbon, graphite, graphene-based materials, hard carbon, soft carbon, carbon nanotubes, porous carbon), a silicon-based material (e.g. silicon and silicon dioxide), lithium titanate (LTO, $Li_4Ti_5O_{12}$), tin, tin oxide (SnOx), molybdenum oxide ($MoO_2$), molybdenum disulfide ($MoS_2$), nickel oxide (NiOx), copper oxide (CuOx), and/or combinations thereof. In some embodiments, the cathode active material in an energy storage device is selected from a carbonaceous material, a lithium nickel manganese cobalt oxide (NMC, e.g. $Li(NiMnCo)O_2$), a lithium manganese oxide (LMO, e.g. $LiMn_2O_4$), a lithium cobalt oxide (LCO, e.g., $LiCoO_2$), a lithium nickel cobalt aluminum oxide (NCA, e.g. $LiNi_{0.8}CO_{0.15}Al_{0.05}O_2$), $LiMn_{1.5}Ni_{0.5}O_4$ (LMNO), an olivine (such as $LiFePO_4$), chalcogenides (Li-$TiS_2$), tavorite ($LiFeSO_4F$), manganese oxide (MnOx), sulfur, lithium sulfide ($Li_2S$), and/or combinations thereof. In some embodiments, the energy storage device is sodium-ion battery. In some embodiments, the battery is zinc-ion battery.

Electrolyte: In some embodiments, the electrolyte is selected from aqueous, super-concentrated aqueous electrolyte, hybrid electrolyte, or organic electrolytes. In some embodiments, an organic electrolyte comprises at least one salt in at least one organic solvent or other non-aqueous solvents. In some embodiments, the super-concentrated aqueous electrolyte comprises at least one metal salt in water with a molal concentration between 1 m and 100 m. In some embodiments, the hybrid electrolyte further comprises at least one salt in a mixture of water and at least one non-aqueous solvent, wherein the molal concentration is between 0.1 m and 20 m, wherein the volume percent of water in the solvent mixture is between 1% to 99%, wherein the non-aqueous solvent(s) is an organic solvent or other solvents, and wherein the salt can be selected from any kind of organic salt or inorganic salt.

Foil/substrate: In some embodiments, the electrode substrates or foils are selected from metals such as aluminium (Al), copper (Cu), titanium (Ti), nickel (Ni), stainless steel (ss), a metal-based alloy, and carbonous materials such as graphite foil. In some embodiments, the current collector foil for the anode and cathode are different, e.g. in a lithium ion battery, one may be copper and the other aluminum.

Separator: In some embodiments, the separator is electrically insulative and has pores. In the preferred embodiment, the separator is a cellulose separator. In some embodiments, the separator is selected from glass fibres, cellulose derivatives, polymer membranes such as polypropylene, polyethylene, polytetrafluoroethylene, PVDF, and polyvinyl chloride, or their combinations. In at least one embodiment, the thickness of the separator is in a range between 5 µm and 100 µm. In some embodiments, the separator comprises multiple layers. In some embodiments, the separator may be coated with other materials.

Binder (for dry film): In the preferred embodiment, the binder(s) are selected from a material than can be fibrillated. In some embodiments, the binder is polytetrafluoroethylene (PTFE). In some embodiments, the binder is selected from a group consisting of PTFE, polyvinylidene fluoride (PVDF), polyvinyl alcohol (PVA), polyvinyl acetate, polyvinylpyrrolidone (PVP), polyacrylic acid (PAA), cellulose, carboxymethyl cellulose, PEO, polypropylene (PP), and their combinations.

Binder for glue: Water-based or non-water based conductive glue is prepared using one or more binders and an additional conductive additive and optionally active materials. In some embodiments therein an aqueous (water based), or non aqueous, or organic liquid (organic solvent) formed with one or more additional binder materials is used to form a conductive glue used to bond (attach) the electrode to the substrate foil. In the preferred embodiment the liquid is water. In some embodiments, the conductive glue includes of one or more binders, one or more conductive additives, one or more solvents or liquids, optionally wetting agent, optionally stabilizer, and optionally active materials. In some embodiments, the binder is selected from a group including PTFE, polyvinylidene fluoride (PVDF), polyvinylpyrrolidone (PVP), polyacrylic acid (PAA), cellulose, carboxymethyl cellulose (CMC), styrene butadiene rubber (SBR), casein, sodium alginate, gum arabic, gellan gum, xanthan gum, guar gum, polyethylene oxide (PEO), polyethylene glycol (PEG), gelatin, chitosan, polyvinyl alcohol (PVA), polyvinyl acetate, or their combinations.

In certain embodiments the film may form the positive electrode (cathode), which may include positive electrode active material, wherein non-limiting examples may include: lithium transition metal oxides, examples may include lithium nickel-manganese-cobalt oxides; lithium nickel-manganese-cobalt oxide which may be partially substituted with other transition metals; lithium iron phosphorus oxides; or similar materials.

In certain embodiments the film may form an electrode made of active material which may include any one or more non-limiting examples selected from lithium transition metal oxides, lithium metal iron phosphorus oxides and metal oxides, though this is not limited those described herein. In certain embodiments the film may form the positive electrode and be made of active electrode materials which may include one or more of the following non-limiting examples: a layered compound, for instance lithium nickel oxide ($LiNiO_2$) and/or lithium cobalt oxide ($LiCoO_2$), wherein the active electrode materials may include one or more transition metals; non-limiting examples may include lithium manganese oxides, for instance those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$). Additionally the active electrode materials may include vanadium oxides such as non-limiting examples of $LiV_3O_4$, $LiV_3O_8$, $V_2O_5$ and/or $Cu_2V_2O_7$; Ni-site type lithium nickel oxides represented by the chemical formula of $LiNi_{1-x}MxO_2$ (wherein M is Co, Mn, Al, Cu, Fe, Mg, B or Ga, and x is 0.01-0.3), for instance $Li(Ni, Co, Mn, Al)O_2$, and wherein in certain embodiments the fraction of Ni is 50% or more of the metals except Li, lithium manganese composite oxides represented by the chemical formula of $LiMn_{2-x}M_xO$ (wherein M is Co, Ni, Fe, Cr, Zn or Ta, and x is 0.01-0.1) and/or $Li_2Mn_3MO_8$ (wherein M is Fe, Co, Ni, Cu or Zn); $LiMn_2O_4$ in which Li is partially substituted with an alkaline earth metal ion; lithium metal phosphorous oxides $LiMPO_4$ (wherein M is Fe, Co, Ni or Mn); disulfide compounds; and/or $Fe_2(MoO_4)_3$; or similar materials though not limited by description to those stated herein.

In certain embodiments the film may form the electrode which may be a negative electrode, and the active material may include a negative electrode active material. Non-limiting examples of the negative electrode active material may include: carbon material or carbonous material or carbon such as activated carbon, graphite-based carbon, non-graphitizable carbon and/or metal composite oxides examples may include $Li_xFe_2O_3$ (0:S x:S 1), $Li_xWO_2$ (0:S x:S 1) and/or $Sn_xMe_{1-x}Me'_yO_z$ (Me:Mn, Fe, Pb, Ge; Me':Al, B, P, Si, which include elements of Group 1, 2 or 3 in the Periodic Table, halogen; 0<x:S 1; 1: Sy:S 3; 1:S z:S 8); lithium alloy; lithium metal; silicon-based alloy; tin-based alloy; silicon oxides examples include SiO, SiO/C and/or $SiO_2$. Additionally in certain embodiments the negative electrode film may include metal oxides, such as $Bi_2O_3$, $Bi_2O_4$ and $Bi_2O_5$; GeO, $GeO_2$, PbO, $PbO_2$, $Pb_2O_3$, $Pb_3O_4$, $Sb_2O_3$, $Sb_2O_4$, $Sb_2O_5$, SnO, $SnO_2$. Additionally in certain embodiments the negative electrode film may include conductive polymers which may include Li—Co—Ni type materials; polyacetylene as a few non-limiting examples.

Dry Electrolyte Materials: In certain embodiments the dry electrolyte powder may be 80-100% by weight a ceramic material such as a non-limiting examples an oxide such as a garnet-structure oxide, additional examples may include; lithium lanthanum zirconium niobium oxide (LLZNbO) (e.g. $Li_{6.5}La_3Zr_{1.5}Nb_{0.5}O_{12}$), lithium lanthanum zirconium oxide (LLZO) with various dopants (e.g. $Li_{6.5}La_3Zr_2O_{12}$ or $Li_7La_3Zr_2O_{12}$), lithium lanthanum zirconium tantalum oxide (LLZTO) (e.g. $Li_{6.4}La_3Z_{1.4}Ta_{0.6}O_{12}$), lithium lanthanum zirconium tungsten oxide (LLZWO) (e.g. $Li_{6.3}La_3Zr_{1.65}W_{0.35}O_{12}$), which may additionally comprise a perovskite-structure oxide, for example, lithium aluminum titanium phosphate (LATP) (e.g. $Li_{1.4}Al_{0.4}Ti_{1.6}(PO_4)_3$), and/or lithium lanthanum titanate (LLTO) (e.g. $Li_{0.5}La_{0.5}TiO_3$, $Li_{0.34}La_{0.56}TiO_3$, or $Li_{0.29}La_{0.57}TiO_3$), additionally non-limiting examples of additional materials include a lithium superionic conductor $Li_{2+2x}Zn_{1-x}GeO_4$ (LISICON), for example lithium aluminum germanium phosphate (LAG or sodium superionic conductor i.e. NASICON-type LAGP) (e.g. $Li_{1.5}Al_{0.5}Ge_{1.5}(PO_4)_3$ or $Li_{1.5}Al_{0.5}Ge_{1.5}P_3O_{12}$), lithium aluminum titanium phosphate (LATP) (e.g. $Li_{1.3}Al_{0.3}Ti_{1.7}(PO_4)_3$), additionally the a phosphate material or additive for example, lithium germanium phosphate (LGPO) (e.g. $LiGeiPO_4)_3$), lithium titanium phosphate (LTPO) (e.g. $LiTi(PO_4)_3$), lithium phosphate (LPO) (e.g. gamma-$Li_3PO_4$ or $Li_7P$), and/or lithium phosphorus oxynitride (LiPON).

In certain embodiments the dry electrolyte powder may include a polymer which may be 80-100% of the powder by weight: non-limiting examples may include; PEO, PEO-LiTFSi, PEO-LiTFSi/LLZO, PEO-LiClO₄, PEO-Li-ClOiLLZO, PEO-PTFE, poly (3,4-ethylenedioxythiophene), polyethylene glycol (PEG), polyphenylene oxide (PPO), polystyrene sulfonate (PEDOT:PSS), a polyether-based polymer, a polyester-based polymer, a nitril-based polymer, a polysiloxane-based polymer, polyurethane, poly-(bis((methoxyethoxy)ethoxy)phosphazene) (MEEP), and/or polyvinyl alcohol (PVA).

In additional embodiments the dry electrolyte powder may include a sulfide of 80-100% by weight: non-limiting examples may include; lithium sulfide (LS) (e.g. $Li_2S$), glassy lithium sulfide boron sulfide (LSBS) (e.g. $Li_2S$—$B_2S_3$), lithium germanium sulfide (LGS) (e.g. $Li_4GeS_4$), lithium phosphorus sulfide (LPS) (e.g. $Li_3PS_4$ for instance $75Li_2S$—$25P_2S_5$ and/or $Li_7P_3S_{11}$ for instance $70Li_2S$—$30P_2S_5$), glassy lithium sulfide phosphorus sulfide (LSPS) (e.g. $Li_7S$—$P_2S_5$), glassy lithium sulfide silicon sulfide (LSSiS) (e.g. $Li_2S$—$SiS_2$), lithium silicon phosphorus tin sulfide (LSPTS) (e.g. $Li_x(SiSn)P_yS_2$), argyridite $Li_6PS_5X$ (X=Cl, Br) (e.g. LPSBr for instance $Li_6PS_5Br$, LPSCl for instance $Li_6PS_5Cl$, LPSClBr for instance $Li_6PS_5Cl_{0.5}Br_{0.5}$, or LSiPSCl for instance $Li_{9.54}Si_{1.74}P_{1.44}S_{11.7}Cl_{0.3}$), or thio-LISICON (e.g. LGPS for instance $Li_{10}GePS_{12}$).

In certain embodiments the powder mixture may contain a lubrication material such as a polymer-containing additive solution or conductive paste which in additional embodiments may be added prior to adding the binder and which in additional embodiments may include a liquid carrier which may be a relatively small amount of liquid to have the powder mixture remain a powder or relatively dry powder.

In certain embodiments the additive may be 0.5%-20% by weight, and may be a polymeric compound, surfactant or viscous liquid; examples include mineral oil or wax. These additives may act as a dispersant for carbon nanotubes or as a binder. Examples may include materials described in U.S. Pat. No. 8,540,902, which provides specific examples of dispersants and polymeric binders such as thermoplastic polyester resin, polyethylene, polypropylene, polyamide, polyurethane, polyvinyl chloride, polyvinylidene fluoride, polyvinylpyrrolidone, polystyrene sulfonate, polyphenylacetylene, polymetaphenylenevinylene, polypyrrole, polyphenylene benzobisoxazole, natural polymers, amphiphilic materials in aqueous solutions, anionic aliphatic surfactant, cyclic lipopeptido bio surfactant, sodium dodecyl sulfate, water-soluble polymers, polyvinyl alcohol sodium dodecyl sulfate, polyoxyethylene surfactant, polyvinylidene fluoride (PVDF), carboxyl methyl cellulose (CMC), hydroxyl ethyl cellulose polyacrylic acid, polyvinyl chloride as non-limiting examples and may include one or more of the described or combinations thereof. Additional examples of polymer additive or binder may include styrene-butadiene rubber (SBR). The liquid additive which may be used as a dispersion material or carrier and may be used to produce the additive solution may include an aqueous or non-aqueous additive, and non-limiting examples may include one or more of the following chemicals such as: acetone, an acetate ester, an alcohol, diethyl carbonate, dimethyl carbonate, ethanol, a glycol, a hydrocarbon, isopropanol, and particularly n-methyl-pyrrolidone.

In an exemplified embodiment of the present disclosure, there is provided an energy storage device as described as a secondary battery. In an exemplified embodiment of the present disclosure, there is provided an energy storage device as described as a primary battery. In an exemplified embodiment of the present disclosure, there is provided an energy storage device as described as a supercapacitor. In certain embodiments the film may be used for an electrochemical device which may be a primary or secondary battery, particularly a lithium-ion secondary battery; another example may include a supercapacitor, hybrid or pseudocapacitor.

Electrode Battery Material: The active material of the electrode in exemplary embodiments may make up the majority of the powder mixture, a non-limiting example being 70-99% (e.g. 90%) by weight. The active electrode material of the cathode may include a lithium metal oxide; some non-limiting examples may include lithium nickel cobalt aluminum oxide (NCA), lithium nickel manganese oxide (LMNO), lithium manganese oxide (LMO), lithium nickel manganese cobalt oxide (NCM), etc. The active electrode material of the anode may include, to name a few non-limiting examples, graphite, silicon dioxide ($SiO_2$), a mixture of the two, etc.

In certain embodiments, the dry electrode film may include a positive electrode active material to make up the majority of the powder mixture, a non-limiting example being 70-99% by weight, including lithium transition metal oxides; examples may include lithium cobalt oxide ($LiCoO_2$), lithium iron phosphate ($LiFePO_4$), lithium nickel manganese cobalt oxide ($LiNi_xMn_yCO_zO_2$), lithium manganese oxide ($LiMn_2O_4$), lithium nickel oxide ($LiNiO_2$), lithium nickel cobalt aluminium oxide ($LiNi_{0.8}Co_{0.15}Al_{0.05}O_2$), lithium-rich layered oxides ($Li_{1+x}TM_{1-x}O_2$, TM: transition metal), vanadium oxides such as $LiV_3O_4$, $LiV_3O_8$ and $V_2O_5$.

In certain embodiments the dry electrode film may include a negative electrode active material of 70-99% by weight; non-limiting examples may include synthetic graphite, natural graphite, carbon, tin oxide (SnOx), titanium oxide ($TiO_2$), lithium titanium oxide ($Li_4Ti_5O_{12}$), silicon-graphite, silicon oxide (SiOx).

In certain embodiments the dry solid-electrolyte film may be 70-99% by weight of ion-conducting inorganic ceramic oxides; non-limiting examples may include garnet-based ceramics such as $Li_7La_3Zr_2O_{12}$, perovskites such as $La_{0.57}Li_{0.29}TiO_3$, Li-superionic conductors (LISICON) such as $Li_{1+x}Al_xTi_{2x}(PO_4)_3$, sodium superionic conductors (NASICON) such as $Li_{1.3}Al_{0.3}Ti_{1.7}(PO_4)_3$.

In certain embodiments the solid-electrolyte film may include a sulfide-based inorganic material; non-limiting examples may include lithium sulfide ($Li_2S$), lithium sulfide boron sulfide ($Li_2S-B_2S_3$), lithium germanium sulfide ($Li_4GeS_4$).

In certain embodiments the dry solid-electrolyte film may include an ion-conducting polymer such as polyethylene oxide (PEO), polyvinylidene fluoride (PVDF), poly(vinylidene fluoride-co-hexafluoropropylene) (PVDF-HFP), polyethylene glycol (PEG), and other additives including but not limited to a salt such as LiTFSi, $LiClO_4$, $LiPF_6$, and/or ion-conducting oxides or sulfides such as those mentioned in the above statements.

The binder or adhesion material (glue) may include a material soluble in a solvent, e.g. water, or be formed as an acrylic binder, or the like.

Film/Powder Activator: In certain embodiments the film prepared for use in an energy storage device may undergo an additional process referred to as an activation step (reference in U.S. Pat. No. 11,616,218). Some non-limiting examples of materials that may be used in an activation step include solvents added to the prefilm powder mixture or administered directly to the film. Non-limiting example solvents may include: acetates (e.g. methyl acetate, ethyl acetate), hydrocarbons (e.g. hexane, benzene, toluene), alcohols (e.g. butanol, ethanol, isopropyl alcohol, methanol, propanol), acetone, dimethyl carbonate (DMC), diethylcarbamazine (DEC), glycols, tetrachloroethylene, etc.

In certain embodiments the film's active electrode materials may include 70-98 wt % active material; 0.5-10 wt % conductive material; 0.5-10 wt % binder. In exemplary embodiments the film's active electrode materials may include 85-98 wt % active material; 0.5-5 wt % conductive material; 0.5-10 wt % binder.

In certain embodiments the film for use in an energy storage device may be partially composed of a filler. In certain embodiments the filler may be an ingredient utilized to inhibit the film, which in certain embodiments includes an electrode, from swelling.

In certain embodiments, wherein the flexible partial matrix or active electrode material undergoes a kneading step, the kneading may be carried out by using a kneader. In certain embodiments, a few non-limiting examples of devices that may be used for the kneading step include a kneader, a batch kneader, a continuous kneader, a twin screw extruder, a single screw extruder.

In certain embodiments utilizing the present disclosure, a method to prepare a film for use in an energy storage device may benefit by eliminating a drying step for removing a solvent from the powder mixture or film.

The film for use in an energy storage device according to the present disclosure may show increased flexibility, tensile strength, and/or durability, therefore, when the film is initially wound and stored, or subsequently dewound, no breakage or cracking is observed, advantageously.

Embodiments, depending on their configuration, may exhibit all or fewer than all of the advantages described herein. Other advantages not mentioned may be present in one or more of the embodiments.

Features from any of the embodiments may be combined with features from any of the other embodiments to form another embodiment within the scope of the invention.

All parameters, dimensions, angles, materials, quantities and configurations described or shown herein are examples only and may be changed depending on the specific embodiment implemented. Temperatures that have been given to the nearest degree include all temperatures within a range of ±0.5° C. of the given value. Likewise, numbers and percentages are specified to the nearest significant digit. All ranges given include all subranges within the range. For example, if a range is given as m-q, then the ranges m-n, n-p and p-q are included, where n and p are any values that satisfy m<n<p<q. In general, unless otherwise indicated or clear from the context, singular elements may be in the plural and vice versa with no loss of generality.

It will be clear to one having skill in the art that further variations to the specific details disclosed herein can be made, resulting in other embodiments that are within the scope of the invention disclosed.

Throughout the description, specific details have been set forth in order to provide a more thorough understanding of embodiments of the invention. However, the invention may be practised without these specific details. In other instances, well known elements have not been shown or described in detail and repetitions of steps and features have been omitted to avoid unnecessarily obscuring the invention. Accordingly, the specification and drawings are to be regarded in an illustrative, rather than a restrictive, sense. It will be clear to one having skill in the art that variations to the details disclosed herein can be made, resulting in other embodiments that are within the scope of the invention disclosed. Accordingly, the scope of the invention is to be construed in accordance with the substance defined by the claims.

Terms used herein and throughout this disclosure, should not be construed as limited to general and dictionary meanings and also include the appropriate definition as defined by the inventor, on the principle the inventor is allowed to define terms in order to provide the best explanation of the invention or particular aspect thereof.

The terminology used herein is for the purpose of describing and depicting particular embodiments of the invention and is not intended to be limiting for any particular aspects or embodiments of the disclosed invention.

Throughout the description and specification contained herein the singular forms "a", "an" and "the" are intended to include the plural forms as well, unless the context clearly indicates otherwise.

The terms "comprises" and/or "comprising", or "includes" and/or "including" if and when used in this specification, are not intended to preclude the presence of other elements but also specify the additional presence of other elements, unless otherwise stated.

The electrode film may be produced by various methods; some non-limiting examples include traditional wet "slurry" coating methods, extrusion methods, and dry methods, as a few non-limiting examples and the described system and method features and benefits may be utilized for such methods.

In an exemplary embodiment a dry film production method may be used; some examples for dry film production methods include methods described in the inventor's own prior patents, patent applications, and publications.

The entire disclosure of every reference cited herein is incorporated herein in its entirety.

The invention claimed is:

1. A process for manufacturing a film for an energy storage device, comprising:
   mixing dry, powdered active material with a binder to form a mixture;
   fibrillating the mixture, thereby forming a fibrillated mixture;
   sieving the fibrillated mixture, thereby forming a sieved, fibrillated mixture;
   heating the sieved, fibrillated mixture between rollers to form the film, the rollers being at a temperature between 50° C. and 160° C.; and
   actively cooling the film to between 10° C. and 70° C. within a distance of 30 cm from a location of formation of the film, resulting in a cooled film;
   wherein the film is a dry electrode film or a dry electrolyte film.

2. The process of claim 1, wherein:
   the film is the dry electrode film;
   the dry, powdered active material is activated carbon; and
   the binder is PTFE (polytetrafluoroethylene).

3. The process of claim 2, further comprising mixing carbon black with the activated carbon and the binder, the carbon black being present in the mixture from over 0% to 20% by weight.

4. The process of claim 1, wherein:
   the mixture comprises 1-30% by weight of the binder, and
   the binder is PTFE (polytetrafluoroethylene).

5. The process of claim 1, wherein:
   the mixture comprises 10-15% by weight of the binder; and
   the binder is PTFE (polytetrafluoroethylene).

6. The process of claim 1, wherein the mixture comprises by weight:
   50-99% of the dry, powdered active material;
   1-30% of the binder, and
   0-20% of a conductive additive.

7. The process of claim 1, wherein the mixture comprises by weight:
   75-98% of the dry, powdered active material;
   2-15% of the binder, and
   0-10% of a conductive additive.

8. The process of claim 1, wherein the mixture comprises by weight:
   80-95% of the dry, powdered active material, the dry, powdered active material being activated carbon;
   1.5-15% of the binder, the binder being a fluoropolymer, and
   0-15% of a conductive additive.

9. The process of claim 1, wherein the mixture comprises by weight:
   5-20% of the binder, the binder being a fluoropolymer.

10. The process of claim 1, comprising passing the fibrillated mixture over a vibrating surface before said sieving, said sieving being through a vibrating sieve.

11. The process of claim 1, wherein the film is actively cooled with a current of chilled gas.

12. The process of claim 1, wherein the film is actively cooled with a chilled roller.

13. The process of claim 1, further comprising trimming the cooled film to result in a trimmed, cooled film.

14. The process of claim 1, further comprising:
   trimming the cooled film to result in a trimmed, cooled film;
   applying a first tension to the film, the cooled film and a first portion of the trimmed, cooled film that is adjacent to the cooled film; and
   applying a second tension to a second portion of the trimmed, cooled film;
   wherein the second tension is greater than the first tension.

15. The process of claim 14, further comprising spooling the trimmed, cooled film under the second tension.

16. The process of claim 15, wherein the trimmed, cooled film is uncalendered.

17. The process of claim 14, wherein:
   the first tension is between $6.7\mu N$-$0.13N$ per $mm^2$ cross-section of the second portion of the trimmed, cooled film; and
   the second tension is between $0.033N$-$0.4N$ per $mm^2$ cross-section of the second portion of the trimmed, cooled film.

18. The process of claim 13, further comprising adhering at least some of the trimmed, cooled film to an aluminum foil.

19. The process of claim 18, further comprising prior to said adhering:
   removing oil residue from the aluminum foil; and
   applying adhesive to the aluminum foil.

20. The process of claim 19, wherein the aluminum foil is heated to between 50° C. and 200° C. to remove the oil residue.

21. The process of claim 19, comprising drying the applied adhesive prior to said adhering.

22. The process of claim 18, comprising winding, in layers, into a jelly roll:
   a first piece of the aluminum foil with the adhered, trimmed, cooled film;
   a first separator;

a second piece of the aluminum foil with the adhered, trimmed, cooled film; and a second separator.

23. The process of claim 22, comprising manufacturing the energy storage device using the jelly roll.

24. The process of claim 1, further comprising depositing the sieved, fibrillated mixture between the rollers to a height that is not greater than uppermost points of the rollers.

25. The process of claim 1, wherein the fibrillated mixture is sieved through a 3-10 mm mesh.

26. The process of claim 1, wherein a maximum dwell time of the sieved, fibrillated mixture between the rollers is 5 minutes.

27. The process of claim 1, wherein a maximum dwell time of the sieved, fibrillated mixture between the rollers is 1 minute.

28. The process of claim 1, wherein a maximum dwell time of the sieved, fibrillated mixture between the rollers is 30 seconds.

29. The process of claim 1 comprising mixing a non-aqueous lubricant with the dry, powdered active material and the binder to form the mixture.

30. The process of claim 1 comprising mixing a conductive additive with the dry, powdered active material and the binder to form the mixture.

31. The process of claim 1, wherein the rollers are at a temperature between 80° C. and 140° C.

32. The process of claim 1, wherein the film is actively cooled to below 25° C.

33. The process of claim 14, wherein the mixture comprises by weight:
10-15% of the binder, the binder being PTFE (polytetrafluoroethylene).

34. The process of claim 1, wherein:
the film is the dry electrolyte film;
the dry, powdered active material comprises an ion-conducting inorganic ceramic oxide, a Li-superionic conductor, a sodium superionic conductor, lithium sulfide, lithium sulfide boron sulfide, lithium germanium sulfide, polyethylene oxide (PEO), polyvinylidene fluoride (PVDF), poly (vinylidene fluoride-co-hexafluoropropylene) (PVDF-HFP), polyethylene glycol (PEG), LiTFSi, LiClO$_4$, LiPF$_6$, or any combination selected therefrom; and
the binder is PTFE (polytetrafluoroethylene).

* * * * *